US007787693B2

(12) United States Patent
Siegemund

(10) Patent No.: US 7,787,693 B2
(45) Date of Patent: Aug. 31, 2010

(54) TEXT DETECTION ON MOBILE COMMUNICATIONS DEVICES

(75) Inventor: Frank Siegemund, Aachen (DE)

(73) Assignee: Microsoft Corporation, Redmond, WA (US)

( * ) Notice: Subject to any disclaimer, the term of this patent is extended or adjusted under 35 U.S.C. 154(b) by 954 days.

(21) Appl. No.: 11/561,814

(22) Filed: Nov. 20, 2006

(65) Prior Publication Data

US 2008/0118162 A1 May 22, 2008

(51) Int. Cl.
*G06K 9/34* (2006.01)
(52) U.S. Cl. ..................................... 382/176
(58) Field of Classification Search .................. 382/176, 382/180, 182, 190, 229–231, 282; 358/473–474, 358/462; 348/211.2; 715/201, 202, 204, 715/256–258
See application file for complete search history.

(56) References Cited

U.S. PATENT DOCUMENTS

| | | | |
|---|---|---|---|
| 5,917,944 A | 6/1999 | Wakisaka et al. | |
| 6,219,453 B1 | 4/2001 | Goldberg | |
| 7,551,780 B2* | 6/2009 | Nudd et al. | 382/190 |
| 7,593,605 B2* | 9/2009 | King et al. | 382/313 |
| 7,639,387 B2* | 12/2009 | Hull et al. | 358/1.18 |
| 7,668,792 B2* | 2/2010 | Hagino | 706/45 |
| 2003/0164819 A1 | 9/2003 | Waibel | |
| 2004/0017482 A1 | 1/2004 | Weitman | |
| 2004/0101196 A1 | 5/2004 | Weitman | |
| 2005/0037806 A1 | 2/2005 | Na | |
| 2005/0185060 A1 | 8/2005 | Neven | |
| 2005/0221856 A1 | 10/2005 | Hirano et al. | |
| 2005/0242189 A1 | 11/2005 | Rohs | |
| 2006/0017810 A1 | 1/2006 | Kurzweil et al. | |
| 2006/0098899 A1 | 5/2006 | King et al. | |
| 2006/0100816 A1 | 5/2006 | Prentice et al. | |
| 2006/0114337 A1 | 6/2006 | Rothschild | |
| 2006/0152479 A1 | 7/2006 | Carlson et al. | |

OTHER PUBLICATIONS

"Camera Dictionary", 3yen, website: http://news.3yen.com/2006-09-02/japanese-cellphone-camera-dictionary/, printed: Nov. 14, 2006, 7 pages.
"Scanning Dictionary", Advanced Cellular Imaging—for mobile phones' cameras, 3GVision, http://www.3gvision.com/prod-scan.htm, printed: Nov. 14, 2006, 3 pages.
"Bridging the physical and virtual worlds by local connectivity-based physical selection", Ailisto et al., Pers Ubiquit Comput (2006) 10:333-344, Jun. 2, 2005.
"An Evaluation of Mobile Phone Text Input Methods", Butts et al., Proceedings Third Australasian Conference on User Interfaces, pp. 55-59, 2002.

(Continued)

*Primary Examiner*—Jose L Couso
(74) *Attorney, Agent, or Firm*—Lee & Hayes, PLLC

(57) ABSTRACT

A mobile communications device with an integrated camera is directed towards text. A video stream is analyzed in real time to detect one or more words in a specified region of the video frames and to indicate the detected words on a display. Users can select a word in a video stream and subsequently move or extend the initial selection. It is thus possible to select multiple words. A subregion of the video frame comprising the detected word(s) is pre-processed and compressed before being sent to a remote optical character recognition (OCR) function which may be integrated in an online service such as an online search service.

16 Claims, 10 Drawing Sheets

OTHER PUBLICATIONS

"Automatic Text Location in Images and Video Frames", Jain et al., Proceedings 14th International Conference on Pattern Recognition, vol. 2, pp. 1497-1499, Aug. 16-20, 1998.

"Text Input for Mobile Devices: Comparing Model Prediction to Actual Performance", James et al., Proceedings SIGCHI Conference on Human Factors in Computing Systems, pp. 365-371, 2001.

"Automatic Text Detection and Tracking in Digital Video", Li et al., IEEE Transactions on Image Processing, vol. 9, Issue 1, pp. 147-1156, 2000.

OCR, Mobile, phone, camera, Mediaseek, Dailymotion Partagez Vos Videos, website: http://www.dailymotion.com/video/103259, printed: Nov. 14, 2006, 2 pages.

"A phone which can read English!", phoneyworld.com, website: http://www.phoneyworld.com/newspage.aspx?n=1348, printed: Nov. 14, 2006, 4 pages.

"Out and About with OneNote Mobile", Pratley, C., website: http://blogs.msdn.com/chris_pratley/archive/2005/11/21/494990.aspx, printed: Oct. 20, 2006, 32 pages.

"Adaptive Thresholding for the DigitalDesk", Wellner, P., Technical Report EPC-1993-110, Rank Xerox Ltd., Jul. 1993.

"Finding Text In Images", Wu et al., Proceedings 2nd International Conference on Digital Libraries, pp. 3-12, 1997.

PCT International Search Report dated Feb. 28, 2008 from correspondence PCT Application No. PCT/US2007/082767, 3 pages.

\* cited by examiner

TEXT DETECTION ON MOBILE COMMUNICATIONS DEVICES

TECHNICAL FIELD

This description relates generally to using digital cameras for text detection on mobile communications devices.

BACKGROUND

Mobile communications devices such as mobile phones and personal digital assistants (PDAs) suffer from a shortage of good text input interfaces which restricts the usability of many applications on such devices. For example, consider browsing the internet using a mobile phone; it is difficult for users to manually input search strings and HTTP addresses because of the small number and small size of keys typically available on a mobile phone.

Other approaches for text input on such mobile communications devices have involved using a stylus on a touch screen. However, this requires the provision of an expensive touch screen and the stylus is often difficult to use because of its small size and the small size of the display screen on the mobile device. In addition, any stylus-based user interaction requires the use of two hands at the same time. Thus mobile phones and other hand-held communications devices often do not have a touch screen.

Scanner devices which take the form of a pen and which capture words by moving the tip of the scanner over a printed text are also known. However, these are connected to a stationary computer by means of a cable and are thus not suited for use with mobile communications devices. The pen scanners are not integral with the computer and so may easily be misplaced. Also, pen scanners are not widely available in comparison with mobile phones.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A mobile communications device with an integrated camera is directed towards text in order to detect some or all of that text. A video stream is analyzed in real time to detect one or more words in a specified region of the video frames and to indicate the detected words on a display. Users can select a word in a video stream and subsequently move or extend the initial selection. It is thus possible to select multiple words. A subregion of the video frame comprising the detected word(s) is pre-processed and compressed before being sent to a remote optical character recognition (OCR) function which may be integrated in an online service such as an online search service.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an online search system with integral optical character recognition (OCR) technology, the system described is provided as an example and not a limitation. As those skilled in the art will appreciate, the present examples are suitable for application in a variety of different types of text detection systems. It is not essential to send the detected text to an online service. Also, any OCR technology, if provided, may be separate from any online service or other service to be used.

Figure 1:
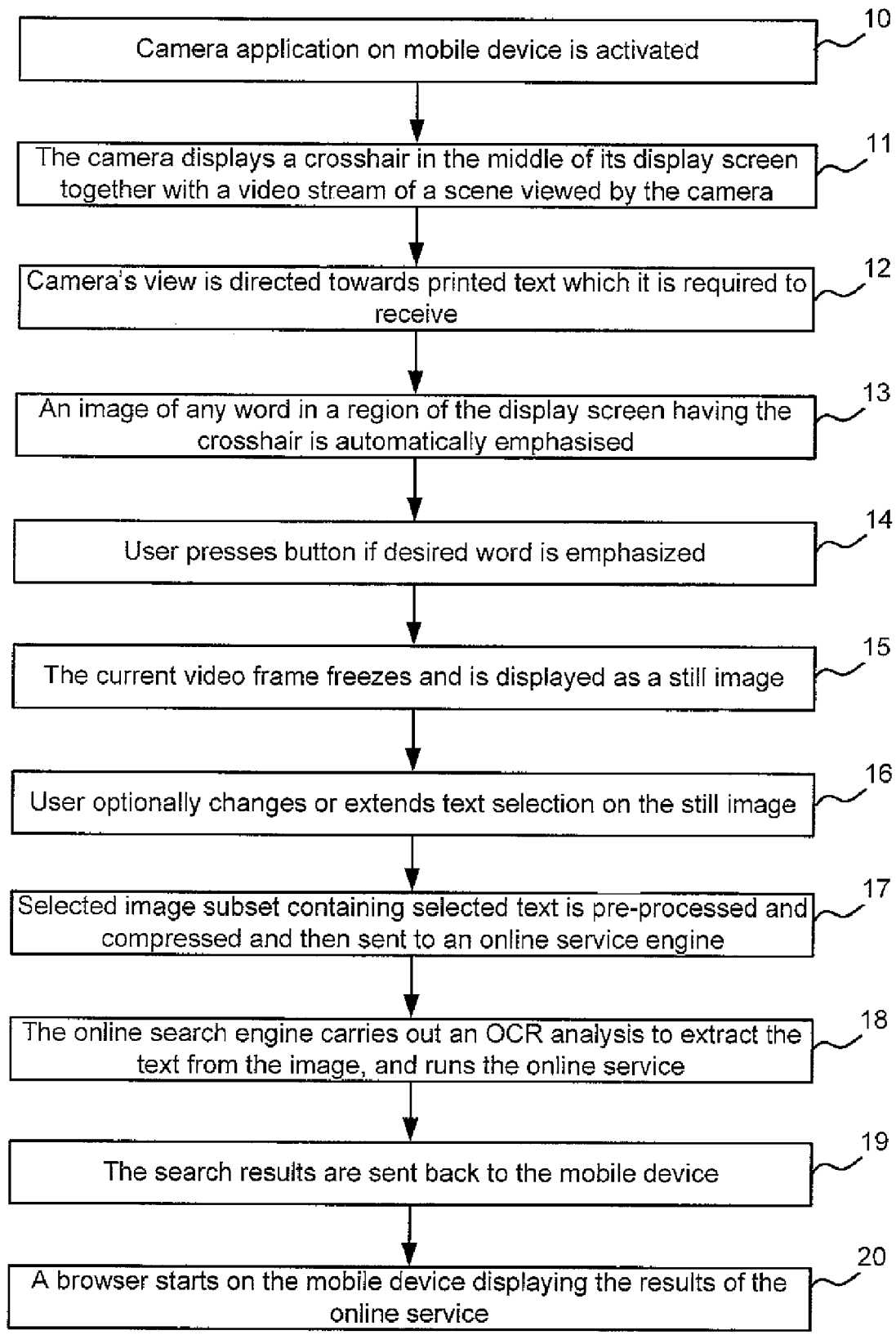
FIG. 1 is a flow diagram of a method of using a camera for text detection on a mobile communications device.

FIG. 1 is a flow diagram of a method of using a camera for text detection on a mobile communications device. A camera application on a mobile communications device is activated (box 10) such that a video stream of a scene viewed by the camera is displayed at a display on the mobile communications device. The camera is also optionally arranged to display (box 11) a crosshair or other marker at a specified location in the display screen, such as the centre of the display screen. This cross-hair or marker is used in some examples to indicate a defined designated display area. This defined designated display area is the region of the video frame or image within which text is to be detected. The cross-hair or marker is associated with the designated display area, for example, by always being close to or within the designated display area.

The camera's view is directed (box 12) towards text (which may be printed or handwritten or provided in any other form) from which it is required to detect one or more words. The text itself may be presented on any suitable medium such as paper, electronic displays, buildings, objects, clothing, mechanical displays, projected images or other media. An image of any word in the designated display area is automatically emphasized (box 13). For example, the word is highlighted, outlined, underlined, shaded or marked in some way on the display. The processing that takes place to detect a subregion of the image containing the word and to emphasize it may take place on-the-fly. In this way it is possible to react to movements of the camera made by the user so that the detected text corresponds appropriately to the text the user directs the camera towards. By carrying out live processing of the video stream in real time, a text selection box is able to move smoothly from word to word rather than "jumping" between video frames in a distracting and unpleasing manner.

A user makes an input (box 14) if the emphasized word is required. The current video frame is then frozen and displayed (box 15) as a still image. The user then optionally changes or extends 16 the text selection on the still image by making user inputs. This enables feedback to be given to the user while they are in the process of selecting words and improves the usability of the system. The selected image subset comprising the selected text is then pre-processed and compressed and sent (box 17) to an online service or any suitable processor in communication with the mobile communications device. For example, the online service is a web-based search engine, dictionary, translation tool, database or other service. The online service comprises optical character recognition (OCR) technology to extract text from the image subset and is able to use the results of the OCR process to initiate a service (box 18) such as an online search. The search results may then be sent (box 19) back to the mobile communications device and displayed to the user. For example, a browser starts on the mobile communications device and displays (box 20) the results of the online service.

In this way, optical character recognition may be provided using resources independent of the mobile communications device. This enables the resources of the mobile communications device, which are typically extremely limited, to be put to other uses. Also, the method provides for use with video streams since text is detected quickly and emphasized on a current video frame. As the video frames change the emphasized text may also change depending on any movement of the camera with respect to text in the camera's view. The user has the option to change and/or extend the selected text whilst the video stream is being received. This enables a user to gain greater control over which text is selected in a simple and easy to use manner. Once the user is happy with the selection, preprocessing and compression of the selection may be carried out on a still image. This provides more time for these processes to be carried out than in the case when streaming video is present. The preprocessing and compressing enables information to be communicated to an OCR capability in an efficient and robust manner.

By detecting text using a mobile communications device in this way it is possible to link real objects that display text to online or other services. Because many objects in our environments already display text this provides a way to make use of that information more fully without any need to alter the objects in our environment.

Figure 2:
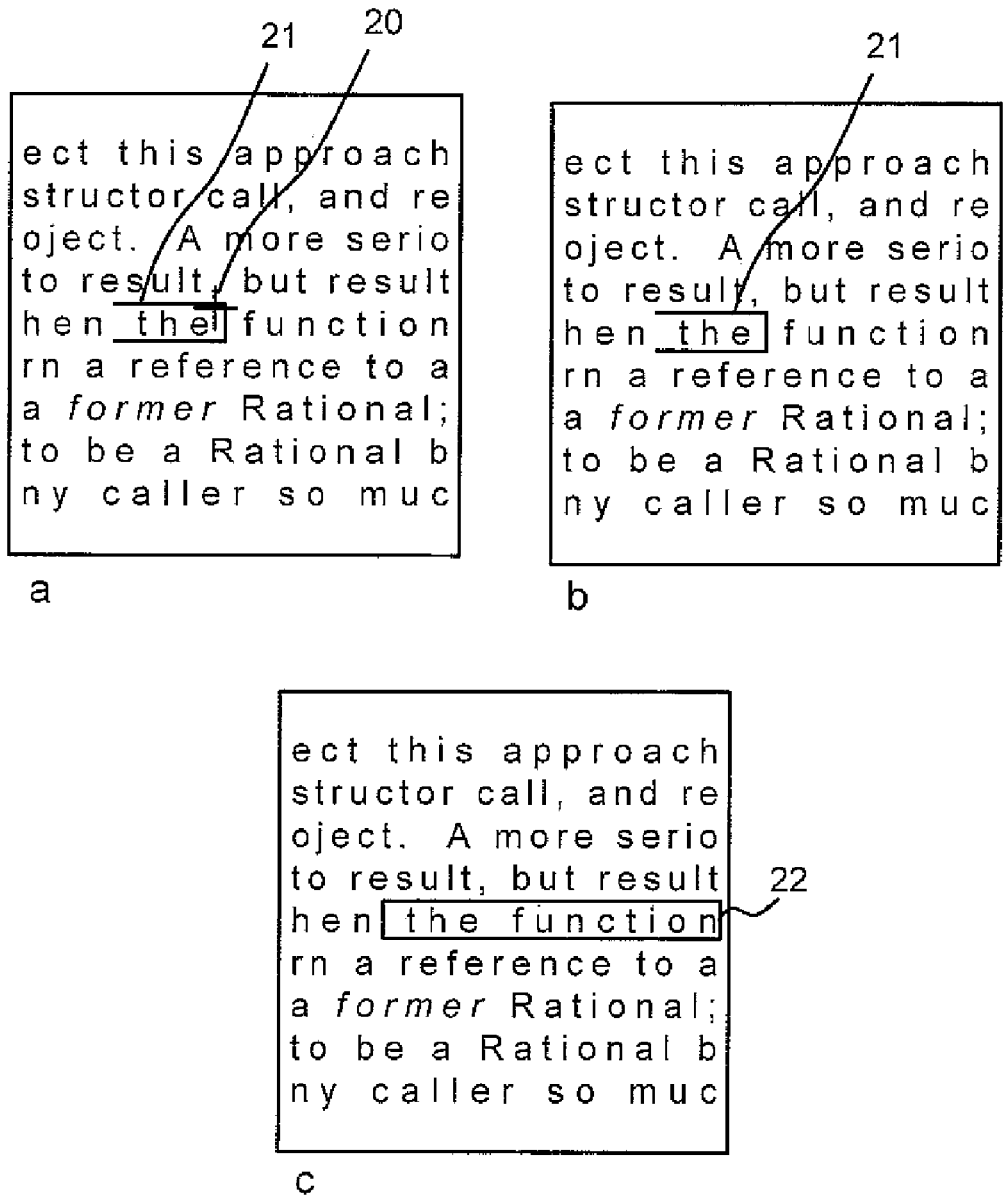
FIGS. 2a to c show example schematic displays on a mobile communications device providing text detection via a camera.

FIGS. 2a-c show example schematic displays on a mobile communications device providing text detection via a camera. In FIG. 2a the display screen of a mobile phone camera is shown presenting a frame of a video stream showing an image of part of a printed document. A crosshair 20 is shown on the display as mentioned above. The word "the" falls under the crosshair 20 and is outlined 21 as shown. The word "the" is detected but not recognized by the mobile communications device since no optical character recognition facility is provided on the mobile communications device. Rather than recognizing words, the position and outline of words are determined. FIG. 2b shows a still image corresponding to the video frame of FIG. 2a. Here the crosshair is not present and this may indicate to the user that the image is a still image. FIG. 2c shows the still image of FIG. 2b but with the selected text 22 having been manually extended to include two words "the function".

Figure 3:
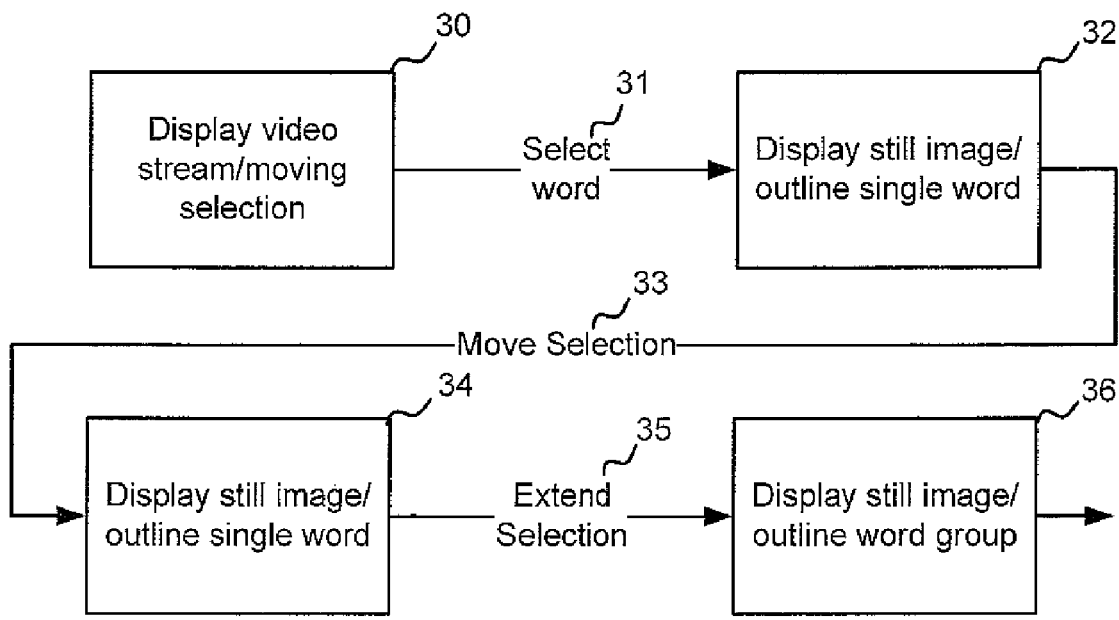
FIG. 3 is a flow diagram of a method of selecting a word group from a live video stream on a handheld device.

FIG. 3 is a flow diagram of a method of selecting a word group from a live video stream on a mobile communications device having a camera. Initially a video stream is displayed at the mobile communications device (see box 30). The video stream shows the scene viewed by the camera and this moves as the camera moves and/or as objects in the scene move. A word is detected and selected 31 as described above and a still image is then displayed at the mobile communications device. A single word is outlined (box 32) or otherwise emphasized in this still image as mentioned above. If a user then optionally moves 33 the selection, for example, by making manual inputs the newly selected word is indicated (box 34) on the display. The selection may then be extended (box 35) as a result of user input and the resulting selected word group indicated (box 36) on the display.

Figure 4:
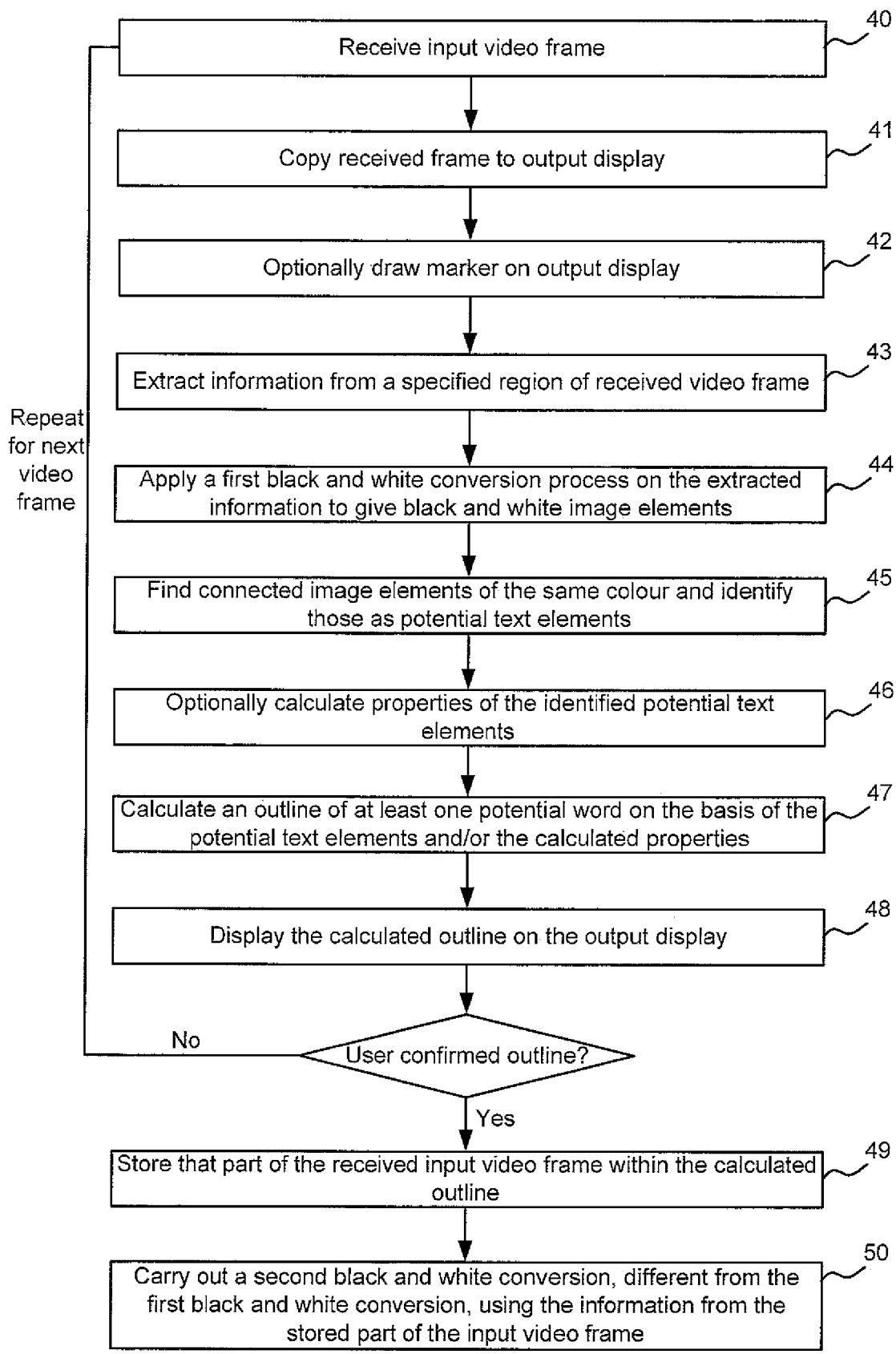
FIG. 4 is a flow diagram of a method of text detection.

FIG. 4 is a flow diagram of a method of text detection. An input video frame is received (box 40) from the camera and presented (box 41) on the output display associated with the camera and provided on the mobile communications device. For example, this is achieved by copying the received frame to the output display. A marker is then optionally drawn on the output display to indicate a specified location on that display, such as the centre or other location of the display. The marker may be a crosshair, a box, a highlight or other indication. Information is then extracted (box 43) from a defined designated display area of the received video frame. For example, the information comprises luminance values for image elements within a specified region of the video frame. The information may also be grayscale values, intensity values, color values or any other suitable information. The designated display area of the video frame may be a rectangle with its longitudinal axis arranged substantially parallel to text depicted on the display (in the case of text written horizontally) or may be any other suitable shape and orientation depending on the type of text being detected, the mode of operation of the camera (landscape or portrait) or other factors. The position of the designated display area may be indicated or associated with the crosshair or other marker, if used. For example, in FIG. 2a the crosshair indicates that words within a rectangular region extending horizontally on the screen, and containing or being near to the crosshair, are to be detected.

A first black and white conversion process is applied (box 44) to the extracted information to give black and white image elements. For example, luminance values for pixels within a horizontal rectangle centered on the crosshair are stored and converted to black and white pixel values. The image elements may be pixels, groups of pixels, or other suitable image elements. The black and white image elements may be represented using any suitable method such as 0 and 1 or other integer values. This conversion process may comprise an adaptive thresholding process as described below with reference to FIG. 5. This enables different lighting conditions to be accommodated and problems to do with camera shake, poor camera resolution and related issues to be dealt with.

Connected image elements of the same color (e.g. all black, or all white) are then identified (box 45) as potential text elements. For example, these may be potential letters, characters or symbols or may be pairs or groups of such text elements in the case that those pairs or groups of text elements are connected. Properties of the potential text elements may then be calculated 46 such as the number of pixels or image elements in each text element and a maximum height of each potential text element. These properties may be used as part of an adaptive thresholding process as described below.

An outline of at least one potential word is then calculated on the basis of the potential text elements and/or the calculated properties (see box 47). The outline is displayed on the output display of the video frame (see box 48). This process repeats for each received video frame (or every other video frame, or each video frame after a specified interval) until a user input is received confirming the displayed outline. That part of the received input video frame within the calculated outline is stored (box 49) either using a complete representation or by storing only luminance values for example. A second black and white conversion process is then carried out (box 50) using the stored part of the input video frame. The second black and white conversion process is different from the first black and white conversion process. This second black and white conversion process may be carried out on a still image rather than a video stream.

As explained with reference to FIG. 4 a first black and white conversion process is carried out (box 44 of FIG. 4, which is repeated in FIG. 5). In some embodiments this black and white conversion process is a thresholding process whereby a fixed color threshold is used to decide whether each image element in a given frame or still image is converted to black or white. This gives workable results where lighting conditions are good and relatively constant across a video frame. It is also possible to change the threshold used between frames so that lighting conditions which change between frames may be taken into account. That is, the threshold may be adapted dynamically between frames or still images.

In other embodiments an adaptive thresholding process is used for the first black and white conversion process. This enables situations in which different lighting conditions occur across a single video frame to be dealt with. Also, different text fonts and types or models of camera may be accommodated more easily using adaptive thresholding. An adaptive thresholding process takes into account the context of an image element. For example, an image element is set to black or white depending on how much its luminance value differs from the luminance values of its neighboring image elements. The threshold for how much the luminance value needs to differ may be adapted dynamically based on the current text captured. It is not essential to use the luminance value here, other values such as the intensity or color may be used.

Figure 5:
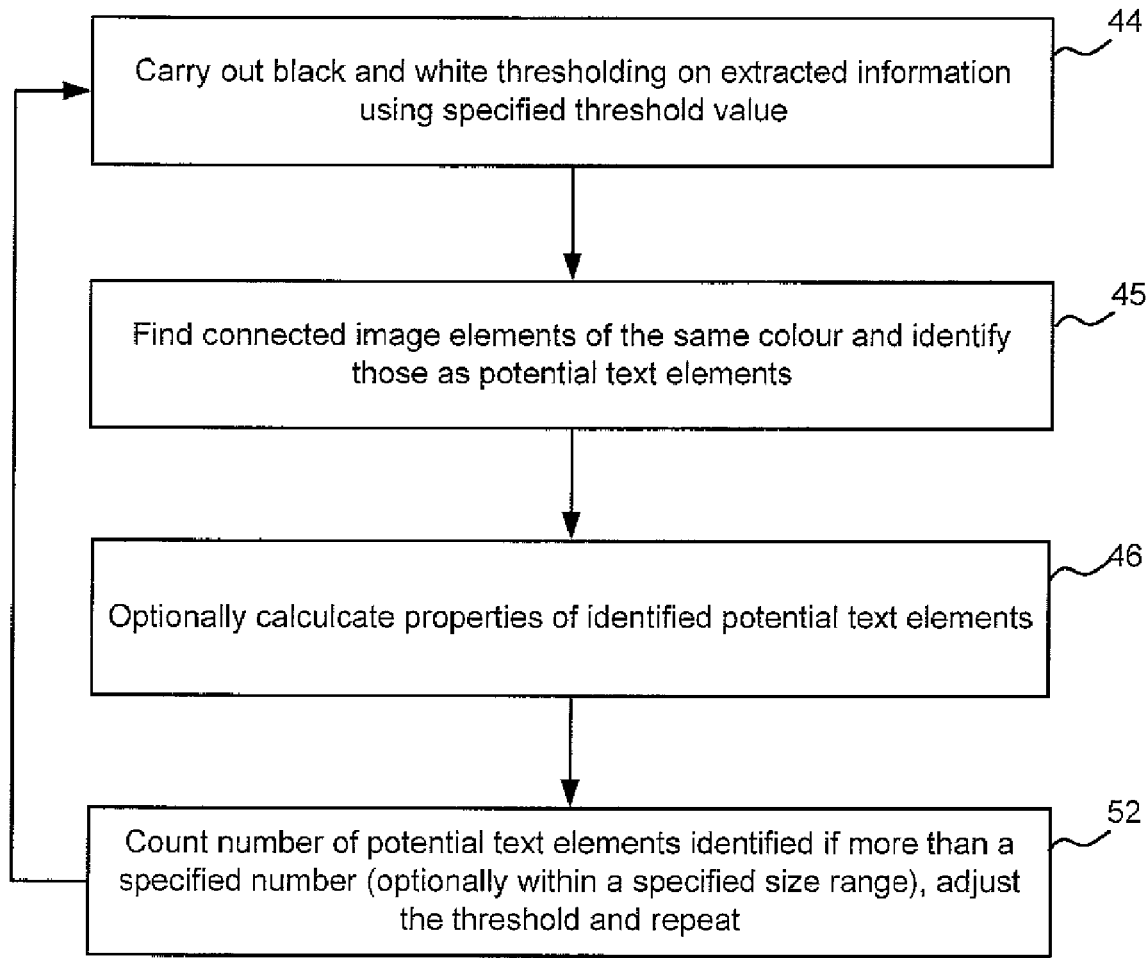
FIG. 5 is a flow diagram of an adaptive thresholding process.

FIG. 5 is a flow diagram of a method for dynamically adjusting the threshold for the first black and white conversion step. A default threshold is first selected and a black and white conversion is carried out on the extracted information from the video frame (box 44). For example, the extracted information comprises luminance values for image elements. Connected image elements of the same color are found (box 45) and identified as potential text elements. Optionally, properties of these connected image elements are calculated (box 46) such as their size and height. Properties may also be second order moments used to assign values to an image or image area. The number of potential text elements identified is counted and on the basis of this the threshold value is either accepted or rejected (box 52). If the threshold is rejected, it is adjusted and the method repeated for the next video frame or still image. It is also possible to count only those potential text elements within a certain size limit or height range, or with other specified ones of the calculated properties. The threshold may then be either accepted or rejected on the basis of part or all of this information, in any suitable combination.

For example, in one embodiment, a low default threshold is first used. If the result is many small regions, the threshold is increased before processing the next video frame. This process seeks to select the smallest threshold which produces no, or very few, small potential text elements. For example, potential text elements comprising fewer than 50% of the number of image elements used to form a typical text character. Such small potential text elements are likely to comprise noise rather than images of real text characters.

This first black and white conversion process is designed to produce a black and white image suitable for detecting text characters or groups of text characters rather than for accurate optical character recognition (OCR). A second black and white conversion process is thus used to provide output optimal for provision to an OCR process. A threshold needs to be selected for use in a black and white thresholding operation, which may be adaptive or otherwise as described above for the first black and white conversion process. The process of selecting this threshold is described, for one example, with reference to FIG. 6. Lighting conditions, the resolution of the camera being used, the characteristics of the text font being used and details of the OCR process itself are all factors affecting the choice of threshold.

Figure 6:
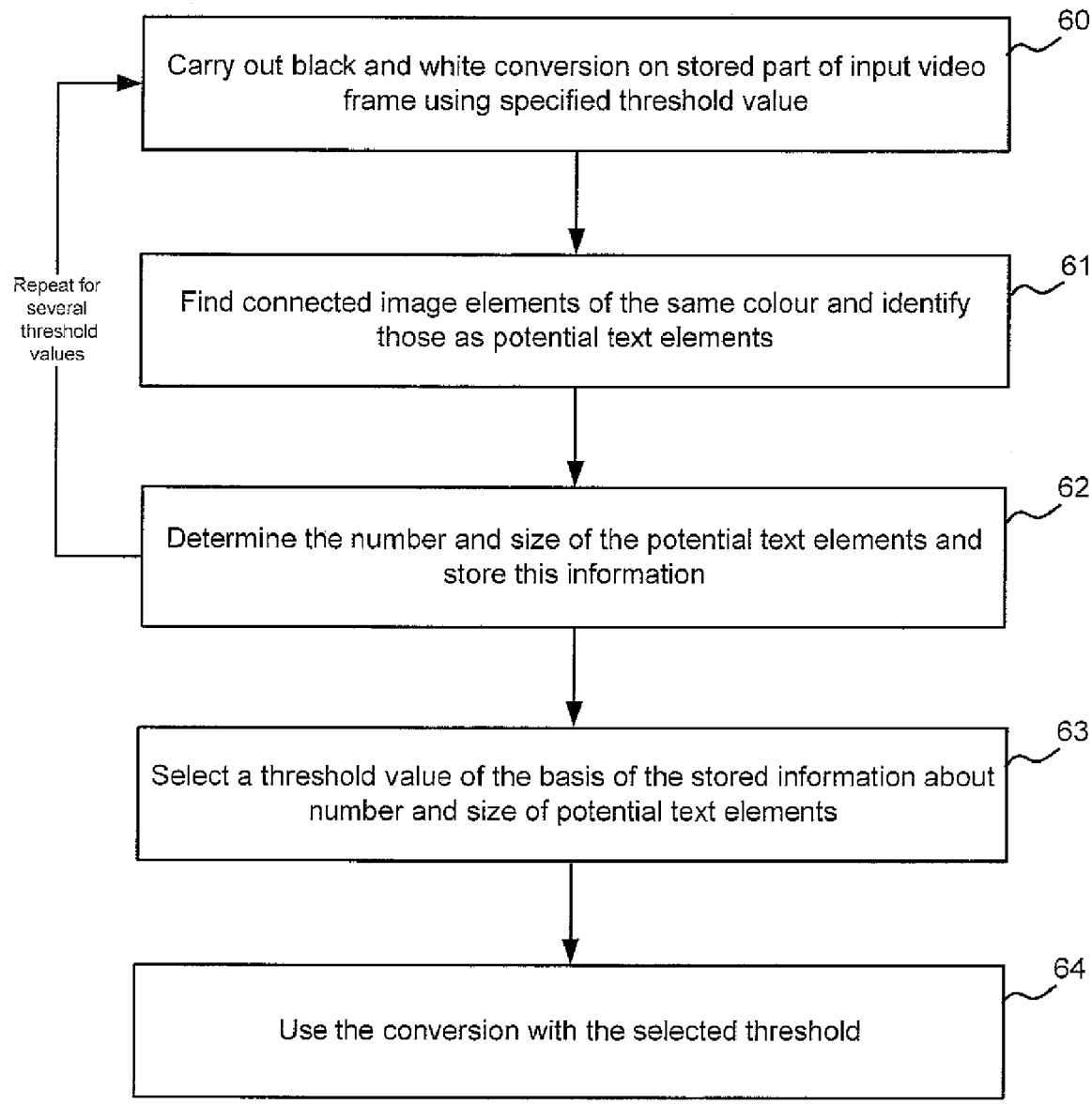
FIG. 6 is a flow diagram of another adaptive thresholding process.

With reference to FIG. 6 a still image has been obtained from the camera and the user has accepted a text selection proposed by the system. This still image may then be processed in a more complex manner than was possible for the video frames used in FIG. 5. This is because the image is still and any requirement to finish processing before the next video frame is presented is optional. A black and white conversion is carried out on the stored part of the input video frame using a specified (e.g. default) threshold value (box 60). Connected image elements of the same color are found and identified as potential text elements (box 61). The number and size of the potential text elements is determined and stored (box 62) and these steps (boxes 60, 61, 62) repeated for several threshold values. A threshold value is then selected on the basis of the stored information about the number and size of the potential text elements (box 63). The conversion formed using the selected threshold is then used (box 64). For example, the threshold which produces the greatest amount of potential text elements of relatively high height is selected. The height here may be associated with the font size of the text.

As described above, the camera is provided in a mobile communications device which is typically handheld. As the camera is directed to view text on documents or other objects, unintentional camera movements often occur. For example, a user's hand may shake or move, especially when the user is in a moving vehicle or is walking. Such unintentional camera movements will affect results of the text detection process mentioned above and in order to reduce or alleviate this, a delayed text selection process is used in some embodiments. The focal distance of the camera may have an influence here. The larger the focal distance the steadier a user has to be for selecting a specific word and the more relevant are small movements of the camera. If the camera needs to be moved further away from the text, for example, to enable more text to be viewed, the steadier a user has to be to keep the crosshair (or other marker) on a specific word.

Figure 7:
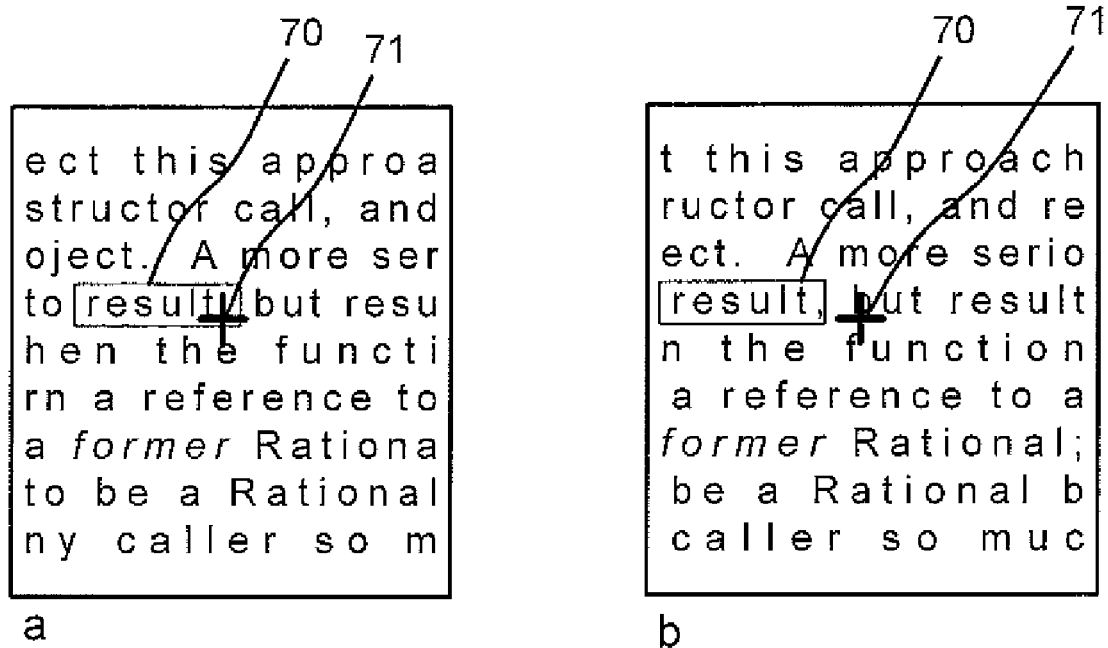
FIG. 7 is a schematic diagram of two displays showing delayed movement of a selected word.

FIG. 7a shows a video frame displayed at a communications device which has a camera viewing text. A crosshair 71 is displayed in the centre of the video frame as mentioned above. In this example, the word "result" is detected and outlined 70. Suppose that the camera moves further to the right in the situation of FIG. 7a. In that case the word "result" would no longer be outlined because it would no longer fall within a central region around the crosshair. (In this example, only text within a specified central region around the crosshair is detected.) If that movement of the camera to the right is unintentional, then loss of the detection of the word "result" is problematic. To address this it is possible to consider information about detected text in previous video frames. Data about previously selected image regions may be considered.

Figure 8:
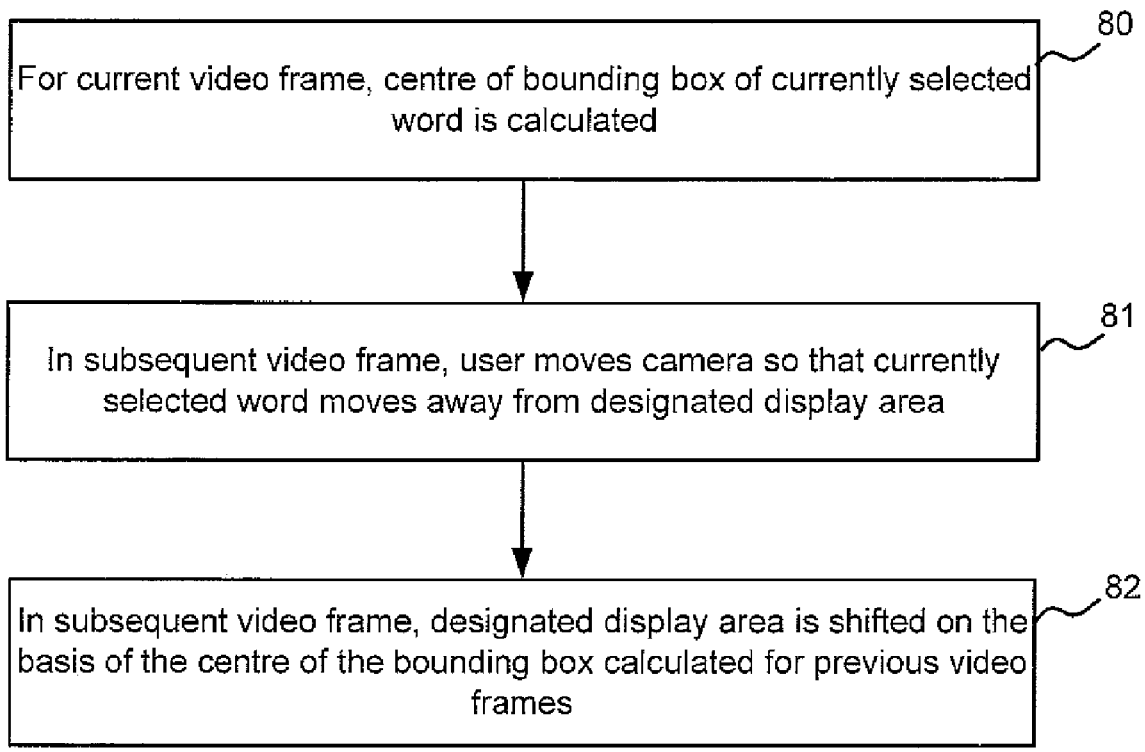
FIG. 8 is a flow diagram of a method of delaying movement of text selections.

FIG. 7b shows a video frame subsequent to that of the video frame in FIG. 7a. It may be immediately subsequent or may follow several video frames after that of FIG. 7a. Again a crosshair is displayed in the centre of the video frame as mentioned above. Because the camera has moved to the right relative to the camera position for FIG. 7a, the text that is visible in the video frame is displaced with reference to the text in FIG. 7a. In this case, the word "but" is now closest to the crosshair and so this word "but" is detected by the text detection process described above. However, instead of outlining the word "but" the word "result" continues to be outlined. This is achieved by moving the logical position of the crosshair (but not its central location on the display). This is now described with reference to FIG. 8.

For a current video frame (such as that of FIG. 7a) the centre of the bounding box of the currently selected word is calculated (box 80). In the example of FIG. 7a this is the centre of the box outlining the word "result" which in this example, is to the left of the central crosshair. In a subsequent video frame (such as that of FIG. 7b) the camera position is different such that the currently selected word "result" moves away from the designated display area (box 81). The designated display area is the specified region close to, or incorporating the crosshair, within which text is to be detected. In the subsequent video frame (such as that of FIG. 7b) the designated display area is shifted or translated on the basis of the centre of the bounding box calculated from one or more previous video frames (box 82). Thus the word "result" is still detected and outlined in the subsequent video frame and the user perceives a delayed movement of the outlined word.

It is not essential to calculate the centre of the bounding box. Any other suitable information about the bounding box may be calculated and used in the method. For example, the locations of two diagonally opposed vertices of the bounding box, the dimensions and location of the bounding box, one or more second order moments of the bounding box, or any other specified characteristic of the bounding box and/or its position relative to the crosshair or other defined position in the image.

As mentioned above with reference to FIG. 1 the selected image subset containing the selected text is preprocessed and compressed before being sent to an online service engine or other facility which provides OCR functionality. More detail about the preprocessing and compression is now given.

Video frames on mobile communication devices are often provided in YUV format. In that case, to reduce the amount of data that needs to be processed, the methods described herein may use only the luminance channel information. However, this is optional. It is also possible to use all the available YUV format information. In addition, only a subset of the image (video frame or still image) is processed. This subset is pre-specified for example, as a rectangular region containing the crosshair location or other defined location. Also, as a result of the black and white conversion process (box 50 of FIG. 4) the information required to represent the subset of the image is further reduced. In addition, image compression techniques may be used to further compress the information.

By preprocessing and compressing the information it is possible to send that information quickly, efficiently and in an inexpensive manner to an OCR function at another location. In this way it is not necessary to provide OCR functionality on the mobile communications device itself. Because OCR functionality is relatively resource intensive and complex this is a benefit for resource limited mobile communications devices.

FIG. 4 above gives an example of a text detection algorithm. Another example is now discussed and follows the high level structure now given:

```
VOID Transform
        (IMediaSample       *pIn,
        IMediaSample        *pOut)
{
    RECT rcOut;
 7: CopyVideoFrame (pIn, pOut);
 8: DrawCrosshair (pOut);
 9: CopyYInternal (pIn, m__rgCopy,
        COPY__RECT);
12: AdaptiveThresholding (m__rgCopy);
13: FindConnectedRegions (m__rgCopy);
14: CalculateRegionProperties ( );
15: if (GetWordOutlineAt (m__ptCross,&rcOut))
    {
17: DrawOutline (pOut, rcOut);
18: CopyRectRegion (m__rgRes, pIn, rcOut);
    }
}
```

In some programming frameworks, video frames flow through a so-called filter graph. Thus in this example, an input video frame (IMediaSample *pIn) is transformed to an output video frame (IMediaSample *pOut.) At first the input sample is copied to the output sample, and the crosshair is drawn to the output sample (see lines 7-8 of the high level code structure above). Video is often provided in the YUV format. This is an advantage for the text detection algorithm because it only requires the luminance component (i.e. the Y component), whereas the color components can be neglected. Thus, in line 9 of the algorithm, only the Y component is copied for further processing. This means that two heuristics may be applied to improve the performance of the algorithm: First, only the luminance component is considered. Second, because typical video frames show multiple lines of text that are aligned horizontally, only a horizontal subset of the frame is copied to an internal buffer. The actual text copy detection takes place on this internal buffer (m_rgCopy).

For carrying out the actual text detection the internal buffer is first converted to a black and white image by applying an adaptive thresholding algorithm. Details of feedback loops used to find appropriate thresholds for use in the thresholding algorithm have been given above with reference to FIGS. 5 and 6.

After the black and white conversions, all regions inside the copied image area are identified; and simple properties are assigned to the different regions. These properties may include the number of pixels in a region as well as its minimum and maximum x and y coordinates. Assuming that each character is a single region in the image, it is now possible to calculate the outline of the word closest to the displayed crosshair (see line 15 of the high level code structure). Given this outline, a rectangle is drawn around the word to signal the user that the corresponding word has been detected. Also, the area containing the word is copied to an internal buffer for processing by other parts of the application (see line 18 of the high level code structure).

Figure 9:
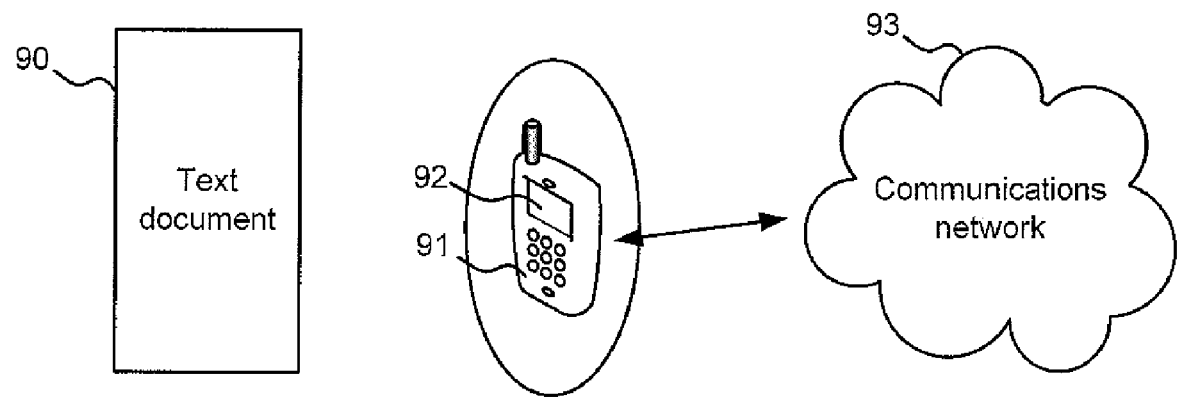
FIG. 9 is a schematic diagram of a mobile communications device arranged to detect text from a text document and to communicate information about the detected text to a communications network.

FIG. 9 is a schematic diagram of a mobile communications device 91 having a camera with a display screen 92. The camera may be used to receive images of a text document 90 or text presented on any object in a scene. The mobile communications device 91 is able to communicate with a communications network 93 or other entity which comprises OCR functionality. The text detection methods and systems described herein may be integrated in a range of mobile applications that rely on text input. For example, mobile online searching. A user may be reading a book or a newspaper and require additional information about terms that are unfamiliar to him or her. The mobile communications device 91 is used to capture video frames, to process these video frames in real time, to select an area containing text elements in the captured video frames, and to modify and extend the selected image area. Moreover, the mobile communications devices is used to preprocess the identified image area and to compress it before transmitting it over a communications link to a server or other entity in the communications network 93. OCR functionality at the server or other entity carries out an OCR analysis on the image and may use the results to initiate an online search. The OCR functionality may be integrated into the online search engine or may be separate. The results of the online search are then returned to the mobile communications device 92.

Figure 10:
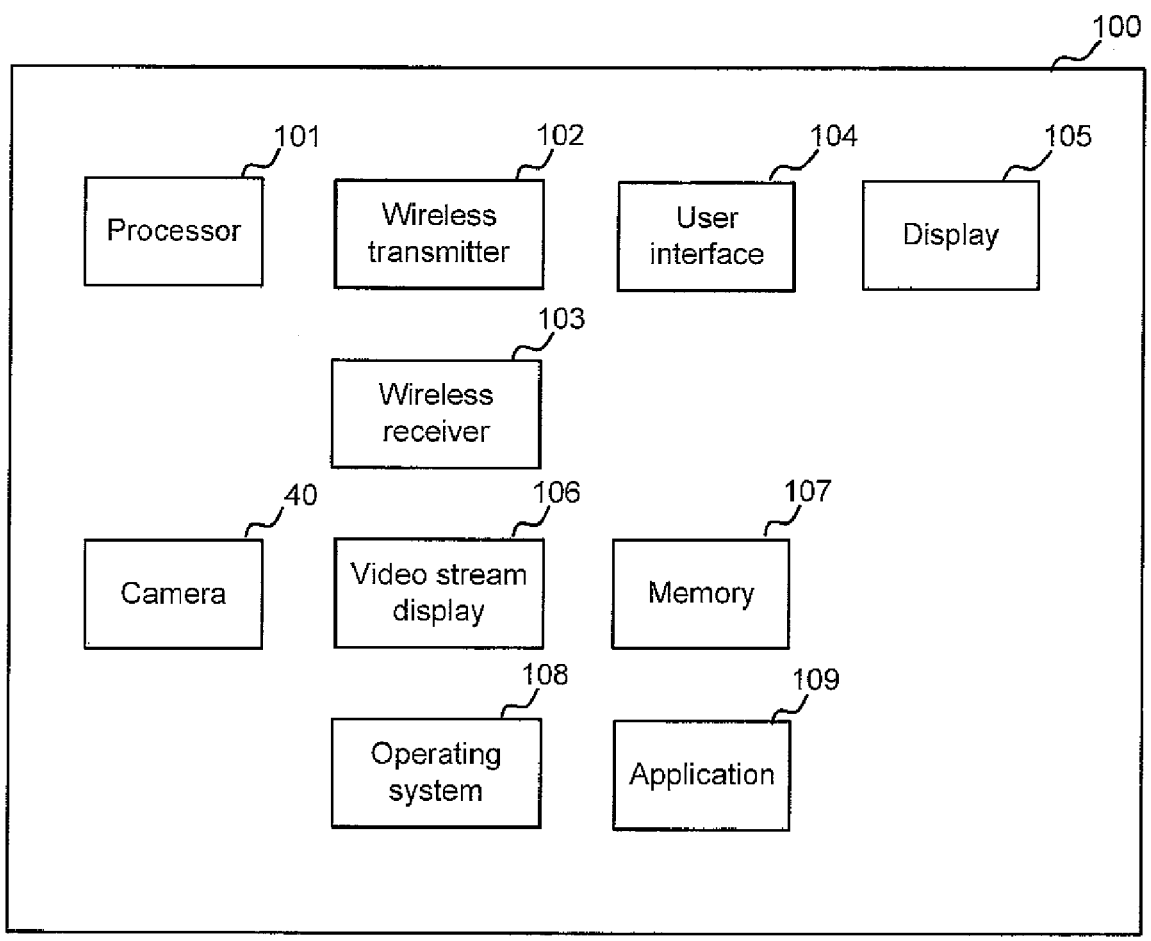
FIG. 10 is a schematic diagram of a mobile communications device.

FIG. 10 is a schematic diagram of a mobile communications device 100. For example, this is a Windows Mobile (trade mark) based smartphone, PDA, or other mobile communications device. The mobile communications device incorporates a camera 40 which is suitable for producing a video stream of objects displaying text. For example, the camera may be an auto-focus camera, may be a camera that has a mode for taking close-up images, or may be a camera which has a removable add-on lens for taking pictures of objects that are close by. A video stream display 106 is also provided such as a liquid crystal display screen or other display device. The communications device has an operating system 108 of any suitable type and comprises a memory 107 and a software application 109 for implementing the methods described herein. For example, the operating system may be Windows Mobile 5.0 (trade mark) or any other suitable operating system. The software application 109 may be implemented as a transform filter in DirectShow (trade mark) or any other suitable environment.

The mobile communications device 100 also incorporates apparatus providing functionality for the device to communicate with a communications network such as the Internet or an Intranet. For example, a wireless transmitter 102 and wireless receiver 103 are provided which may be of any suitable type. A user interface 104 such as a keyboard, touchscreen, microphone, display screen 105 or other user interface equipment is provided. In addition there is a processor 101 of any suitable type.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method comprising:
    receiving, at a camera associated with a mobile communications device, a video stream comprising at least one image comprising text;
    defining, at a processor, a designated display area in the image; and
    detecting, via the processor, a subregion of the image comprising a word in the designated display area, the process of detecting the subregion comprising using a first thresholding process;
    displaying the received image on the mobile communications device and indicating the detected subregion on the display of the image;
    applying, via the processor, a second thresholding process to the detected subregion, that second thresholding process being different from the first thresholding process, to produce a processed subregion;
    sending information about the processed subregion to a remote entity comprising optical character recognition functionality.

2. The computer-implemented method as claimed in claim 1 which further comprises repeating the step of detecting a subregion, and the step of displaying the received image and indicating the detected subregion on the display of that image, for subsequent frames of the video stream in real time.

3. The computer-implemented method as claimed in claim 1 wherein the second thresholding process is carried out on a subregion of a still image rather than a video frame of a real time video stream.

4. The computer-implemented method as claimed in claim 1 wherein the step of displaying the received image on the mobile communications device and indicating the detected subregion on the display of the image further comprises receiving a user input indicating acceptance of the detected subregion and additionally monitoring for user input indicating requirements to modify the detected subregion.

5. The computer-implemented method as claimed in claim 2 wherein the step of detecting a subregion of the image comprising a word in the designated display area, comprises computing information about a bounding box for that subregion in a current video frame, and wherein the method further comprises, for a subsequent video frame, shifting the designated display area on the basis of the computed information about the bounding box.

6. The computer-implemented method as claimed in claim 5 wherein the computed information about the bounding box comprises the position of the centre of that bounding box.

7. The computer-implemented method as claimed in claim 2 wherein the first thresholding process comprises using a specified threshold which is adjusted for each video frame on the basis of information about the detected subregion for that video frame.

8. The computer-implemented method as claimed in claim 1 wherein the first thresholding process comprises assessing an image element with respect to its neighboring image elements.

9. The computer-implemented method as claimed in claim 1 wherein the second thresholding process comprises using a threshold which is dynamically selected on the basis of information about potential text elements detected after using various thresholds.

10. A mobile communications device comprising:
a camera arranged to receive a video stream, the video stream comprising at least one image comprising text; and
a processor arranged to define a designated display area in the image;
the processor being arranged to detect a subregion of the image comprising a word in the designated display area, the process of detecting the subregion comprising using a first thresholding process;
a display arranged to display the received image and indicate the detected subregion on the display of the image;
the processor being arranged to apply a second thresholding process to the detected subregion, that second thresholding process being different from the first thresholding process, to produce a processed subregion;
an output arranged to send information about the processed subregion to a remote entity comprising optical character recognition functionality.

11. A mobile communications device as claimed in claim 10 wherein the processor is arranged to repeat the step of detecting a subregion, and the step of displaying the received image and to indicate the detected subregion on the display of that image, for subsequent frames of the video stream in real time.

12. A mobile communications device as claimed in claim 10 wherein the processor is arranged to carry out the second thresholding process on a subregion of a still image rather than a video frame of a real time video stream.

13. A mobile communications device as claimed in claim 10 which further comprises a user interface arranged to receive a user input indicating acceptance of the detected subregion and wherein the processor is arranged to monitor for user input indicating requirements to modify the detected subregion.

14. A mobile communications device as claimed in claim 11 wherein the processor is arranged to compute information about a bounding box for the subregion in a current video frame, and wherein the processor is arranged, for a subsequent video frame, to shift the designated display area on the basis of the computed information about the bounding box.

15. A mobile communications device as claimed in claim 14 wherein the processor is arranged to adjust a specified threshold used in the first thresholding process for each video frame on the basis of information about the detected subregion for that video frame.

16. One or more computer-readable media with computer-executable instructions for performing acts comprising:
receiving a video stream at a camera associated with a mobile communications device, the video stream comprising at least one image comprising text;
defining a designated display area in the image; and
detecting a subregion of the image comprising a word in the designated display area, the process of detecting the subregion comprising using a first thresholding process
displaying the received image on the mobile communications device and indicating the detected subregion on the display of the image;
applying a second thresholding process to the detected subregion, that second thresholding process being different from the first thresholding process, to produce a processed subregion;
sending information about the processed subregion to a remote entity comprising optical character recognition functionality.

* * * * *